United States Patent [19]

Kluss et al.

[11] 4,274,668
[45] Jun. 23, 1981

[54] PROTECTIVE BAND, IN PARTICULAR A BUMPER COVER FOR AUTOMOBILES

[75] Inventors: Hans Kluss, Wolfsburg; Janez Lampic, Monchen-Gladbach, both of Fed. Rep. of Germany

[73] Assignees: Volkswagenwerk AG, Wolfsburg; Peguform-Werke GmbH, Bötzingen, both of Fed. Rep. of Germany

[21] Appl. No.: 28,521

[22] Filed: Apr. 9, 1979

[30] Foreign Application Priority Data

Apr. 8, 1978 [DE] Fed. Rep. of Germany ....... 2815263

[51] Int. Cl.³ .............................................. B60R 13/04
[52] U.S. Cl. ..................................... 293/142; 52/717; 293/128
[58] Field of Search ............... 293/142, 144, 155, 122, 293/126, 128; 224/318, 327; 52/716, 717, 718

[56] References Cited

U.S. PATENT DOCUMENTS

| 3,309,122 | 3/1967 | Van Der Sluys et al. | 52/718 |
| 3,472,546 | 10/1969 | Samuels | 293/128 |
| 3,841,680 | 10/1974 | Muller | 293/142 |
| 4,085,956 | 4/1978 | Weisshappel et al. | 293/142 |
| 4,103,400 | 8/1978 | Munse | 52/717 |

FOREIGN PATENT DOCUMENTS

| 689935 | 7/1964 | Canada | 293/128 |
| 1441051 | 4/1966 | France | 293/128 |

Primary Examiner—John J. Love
Assistant Examiner—Ross Weaver
Attorney, Agent, or Firm—Brumbaugh, Graves, Donohue & Raymond

[57] ABSTRACT

A protective band, e.g. a vehicle bumper cover, is made in the form of a profiled component with a longitudinal groove in its outer surface. Located in the groove is an elastic decorative strip that extends to the ends of the profiled component and through clearances in the end walls of the groove to an area with pocket-like covers. The groove is undercut and the strip is provided with a longitudinal web so as to form a clip connection with the groove. Moreover, the cross section of the strip is constant and safety clamps are attached to its ends. The ends of the elastic strip together with the clamps can be passed through the clearances into the pocket-like cover areas and fastened there under tension by flaps on the clamps.

3 Claims, 2 Drawing Figures

PROTECTIVE BAND, IN PARTICULAR A BUMPER COVER FOR AUTOMOBILES

BACKGROUND OF THE INVENTION

The present invention relates to protective bands and, more particularly, to bumper covers for automobiles that have grooves in their outer surfaces to receive decorative strips.

From German Utility Model No. 67 50 320, 63c, 43–68 it is known to provide a protective band for automobile bodies in the form of a profiled component adapted to absorb light impacts. On one outer surface of the component a longitudinal groove receives an element useful as a decorative strip. The ends of this decorative element are directed through slots or clearances in the end walls of the groove to areas under pocket-like covers that are integral with the profiled component. The cross sections of the element are reduced where they extend through the slots in the end wall of the profiled component so as to make assembly easier. Also, the elements are prevented from sliding out of the cover area by welding or cementing the elements within that area.

In order to prevent the emergence of the element, i.e., the decorative strip or some other strip-like element, from the longitudinal groove in the profiled component due to temperature variations, additional measures must be taken which have not been considered in previous designs. For example, the element must be connected with the profiled component under tension so that expansion with temperature will not cause it to buckle out of the groove. This is not possible when the ends of the element are fixed by welding or cementing or at least is not possible without additional production devices. Moreover, not all materials which may be desirable to employ as an element, can be welded or cemented. Finally, modifications in the cross section over its length are undesirable in that the element can no longer be taken from a rolled-up supply of the element or produced by an extrusion method.

SUMMARY OF THE INVENTION

It is the purpose of the present invention to provide a protective band of the kind having a hollow profiled component with an outer groove for a decorative element or strip that can be constructed with reduced structural and production effort. The attainment of this purpose is a result of undercutting the groove and providing a web on the element so as to form a clip connection with the groove. In addition the cross section of the element is constant and safety clamps are located on its ends to hold the ends of the element in areas under pocket-like covers, which areas are reached through clearances or slots in the profiled components near their ends.

In accordance with an illustrative embodiment of the invention, clamps are applied on the ends of an element having a constant cross section over its entire length. This element may be, e.g., a decorative strip made of any desired elastic material. After connection of the clamps to the element, the element is attached to the profiled component under tension by threading the ends of elements together with the clamps, through clearances in the end walls of the profiled component that lead to the areas under the pocket-like covers, which covers are integral with the profiled component. Advantage is taken of the elasticity of the element, as well as a certain ability of the material of the profiled component to yield, in order to get the clamps through the clearances and to establish the tension in the element. After completion of this assembly process, the clamps act as stops in conjunction with the edges of the profiled components at the clearances so as to prevent the sliding-out of the ends of the element.

Thus, it can be seen that the construction in accordance with the present invention facilitates assembly under tension and, due to the shape of the groove and the cross section of the element, which together form a clip connection, the element is safely held on the profiled component over its entire length.

BRIEF DESCRIPTION OF THE DRAWING

The foregoing and other features of the present invention will be explained in the following detailed description with reference to the drawing in which.

DESCRIPTION OF AN EXEMPLARY EMBODIMENT

Figure 1:
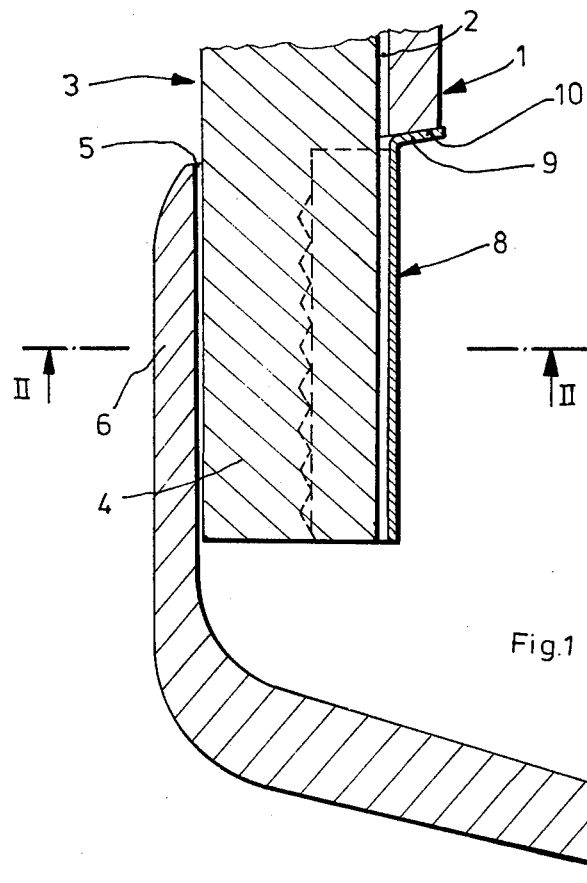
FIG. 1 shows a longitudinal section through a bumper cover of an automobile in the zone of one end of the cover.
Figure 2:
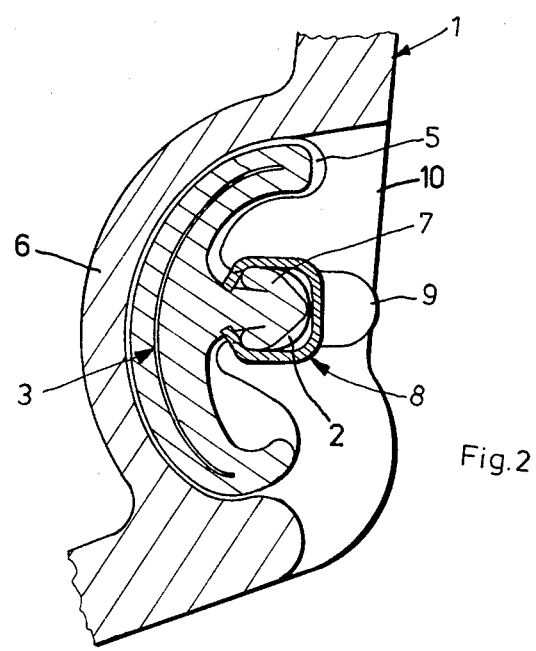
FIG. 2 shows the cross sectional view designated in FIG. 1 by II—II.

A profiled component 1 is provided with an undercut groove 2 (shown in dotted line in FIG. 2) which in part accommodates an element such as a decorative strip 3. The profiled component 1 is usually a hollow element made of hard rubber or a plastic substance and is attached to a metal bumper. The bumper is not shown in the present application, but it is located to the right of the parts shown in FIG. 1. Thus, the profiled component would be arranged like that disclosed in U.S. Pat. No. 3,030,735 to Jacob et al., which is assigned to the assignee of the present invention and is incorporated herein by reference.

Within the framework of the present invention, the term "element" is to be understood as referring to any elongated elastic component, e.g. a decorative strip, which is inserted in full or in part in the groove of the profiled component.

The end 4 of the decorative strip 3 projects through a slot or clearance 5 in the end wall 10 of the groove 2 of the profiled component 1, into an interior area where the end 4 is covered by a pocket-like covering 6, that is integral with the profiled component 1. As is apparent from FIG. 2, the longitudinal groove 2 shown in dotted line, as well as the longitudinal web 7 of the decorative strip 3, are shaped in such a manner that they form a clip connection between the profiled component 1 and the decorative strip 3. In particular, the groove 2 is undercut so as to be narrower on the left side in FIG. 2 than on its right side. Applying tension to element 3 during assembly causes the web 7 to be reduced in cross section and to seat in the groove. Release of some of this tension allows web 7 to expand and be edged or clipped in the groove. Accordingly, the decorative strip 3 is held over its entire length in the zone of the outer surface of the profiled component 1.

In order to ensure tension on the strip 3 and to avoid having it slip out of the groove, the end 4 of the decorative strip has a clamp 8 applied to the longitudinal web 7. The clamp 8 embraces the longitudinal web 7 approximately in a U shape. A flap 9 of the clamp acts as a stop. As can be seen, in particular from FIG. 1, the flap 9 applies itself to the edge of the end wall 10 adjacent the clearance 5.

The clearance 5 is suitably rendered somewhat larger than the cross section of the decorative strip 3 so that the end 4 thereof can be threaded together with the applied clamp 8 through the clearance 5 into the profiled component. Also, since the strip 3 and the component 1 yield under stress, insertion of the ends 4 with the clamps 8 through the clearance 5 can be achieved without difficulty.

Thus, the invention preserves the advantages of a protective band with a profiled component and pocket-like coverings at its ends, which advantages are constituted above all by the covering of the connection between a decorative strip for the band and the profiled component without the need for additional parts. Also extensive stylistic freedom is achieved without the necessity of any noteworthy additional structural changes. The invention further permits extensive freedom in the choice of materials for the profiled component and the decorative strip element, since no cemented or welded connections are required, i.e. the decorative strip is held in place over its entire length by a clip connection with a groove in the profiled component and its ends are held by clamps. The constituents of the decorative strip in accordance with the invention must merely possess sufficient elasticity so that its ends together with the applied clamps can be threaded through the clearances in the end walls and held there under tension.

While the invention has been particularly shown and described with reference to a preferred embodiment thereof, it will be understood by those skilled in the art that various changes in form and details may be made therein without departing from the spirit and scope of the invention. In particular, the protective band of the present invention could be fastened to the doors of a vehicle in order to protect them against damage caused by opening the doors of nearby vehicles.

We claim:

1. A protective band, such as a bumper cover for automobiles, has a profiled component provided with a longitudinal groove on one outer surface for receiving a resilient element useful as a decorative strip, the ends of the entire element project through clearances in an end wall of the profiled component to an area under pocket-like covers integral with the profiled component, the cross-section of which area exceeds that of the groove and the end wall extends across the entire cross section of the profiled component, said ends are protected against sliding out of said area, characterized in that the longitudinal groove is undercut and the element is provided with a longitudinal resilient web means for forming a clip connection with the groove, the element has a cross section which is constant over its entire length and exceeds the cross section of the web means, and safety clamps are applied to the ends of the element for forming stops directed perpendicular to the element, said clamps being designed in such a manner that the ends of the element provided with them can be introduced through the clearances in the end walls into the area under the pocket-like covers and yet form stops against said end walls preventing the element from sliding out of the area.

2. A protective strip in accordance with claim 1, characterized in that the clamps are provided with cross flaps that acts as the stops.

3. A protective strip as in claims 1 or 2, characterized in that the clamps clasp the longitudinal web in U-shape.

* * * * *